United States Patent

Poole et al.

Patent Number: 5,907,947
Date of Patent: Jun. 1, 1999

[54] SAFETY LAWN MOWER BLADE

[76] Inventors: James Terry Poole; Robert C. Burrow, both of 5501 Krueger Dr., Jonesboro, Ark. 72402

[21] Appl. No.: 08/978,902

[22] Filed: Nov. 26, 1997

[51] Int. Cl.[6] .................................................. A01D 34/73
[52] U.S. Cl. .............................. 56/12.7; 56/17.5; 56/295; 56/DIG. 17
[58] Field of Search ........................... 56/255, 295, 12.1, 56/12.7, 17.5, DIG. 17, DIG. 20

[56] References Cited

U.S. PATENT DOCUMENTS

| | | |
|---|---|---|
| 3,621,642 | 11/1971 | Leake, Jr. . |
| 4,054,992 | 10/1977 | Ballas et al. ........................ 56/12.7 X |
| 4,065,913 | 1/1978 | Fisher et al. ............................. 56/295 |
| 4,086,700 | 5/1978 | Inada .................................... 56/295 X |
| 4,189,905 | 2/1980 | Frantello .............................. 56/12.7 X |
| 4,199,926 | 4/1980 | Petty ....................................... 56/295 |
| 4,362,007 | 12/1982 | Kennedy et al. ......................... 56/295 |
| 4,382,356 | 5/1983 | Ballas, Sr. et al. ...................... 56/12.7 |
| 5,722,172 | 3/1998 | Walden ................................ 56/255 X |

*Primary Examiner*—Heather Shackelford

[57] ABSTRACT

A safety lawn mower blade is provided including a central portion removably coupled to a conventional lawn mower. Also included is a plurality of replaceable blades removably coupled to a periphery of the central portion and extended radially therefrom.

9 Claims, 3 Drawing Sheets

SAFETY LAWN MOWER BLADE

BACKGROUND OF THE INVENTION

1. Field of the Invention

The present invention relates to a safety lawn mower blade and more particularly pertains to providing a safe lawn mower blade assembly with easily replaced blades.

2. Description of the Prior Art

The use of lawn mower blades is known in the prior art. More specifically, lawn mower blades heretofore devised and utilized for the purpose of cutting a lawn are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. Nos. 3,133,398; 5,640,836; U.S. Pat. No. 4,062,114; U.S. Pat. No. 5,313,770; and U.S. Pat. No. 5,615,543.

In this respect, the safety lawn mower blade according to the present invention substantially departs from the conventional concepts and designs of the prior art, and in so doing provides an apparatus primarily developed for the purpose of providing a safe lawn mower blade assembly with easily replaced blades.

Therefore, it can be appreciated that there exists a continuing need for a new and improved safety lawn mower blade which can be used for providing a safe lawn mower blade assembly with easily replaced blades. In this regard, the present invention substantially fulfills this need.

SUMMARY OF THE INVENTION

In view of the foregoing disadvantages inherent in the known types of lawn mower blades now present in the prior art, the present invention provides an improved safety lawn mower blade. As such, the general purpose of the present invention, which will be described subsequently in greater detail, is to provide a new and improved safety lawn mower blade which has all the advantages of the prior art and none of the disadvantages.

To attain this, the present invention essentially comprises a disk-shaped central portion having a top face, a bottom face, and a periphery formed therebetween. As shown in FIG. 5, the top and bottom face each has a circular inset portion with a constant depth thereby defining upper and lower peripheral lips. The inset portions have a plurality of spaced circular apertures formed therethrough. Such apertures are further situated adjacent to the peripheral lips. With reference still to FIG. 5, the periphery of the central portion has a plurality of radially extending rectangular slits formed therein between the periphery and an associated one of the circular apertures for reasons that will become apparent hereinafter. A pair of planar rectangular strips are each diametrically coupled within a corresponding one of the circular inset portions. Such strips are each equipped with a length equal to a diameter of the associated circular inset portion and a constant height. Such height is greater than a depth of the circular inset portion thereby extending past the associated peripheral lip. Each strip further includes a central bore formed therein which extends through the entire central portion. A pair of aligned elongated slots are situated on diametrically opposed points and formed through the entire central portion. The bore and slots are adapted for allowing the coupling of the central portion to a conventional lawn mower. Finally, a plurality of flexible, resilient replaceable blades are provided each having an inboard extent with disk-shaped member with an aperture centrally formed therein. A generally rectangular member is integrally coupled to a periphery of the disk-shaped member and extended radially therefrom in co-planar relationship therewith. Each of the blades further includes an outboard extent with an inboard end integrally coupled to the rectangular member in linear alignment therewith. The outboard extent of each blade further has a pair of sharp edges each situated within a similar plane. Further, the outboard extent has a diamond shaped vertical cross-section along its entire length. Such diamond shaped vertical cross-section ideally has an area which reduces from the inboard end to an outboard of the outboard extent. During use, the blades may be removably situated through an associated one of the slits of the central portion. As such, the disk-shaped member snappily engages within the corresponding circular aperture of the central portion so the blades extend radially from the central portion for use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety lawn mower blade which has all the advantages of the prior art lawn mower blades and none of the disadvantages.

It is another object of the present invention to provide a new and improved safety lawn mower blade which may be easily and efficiently manufactured and marketed.

It is a further object of the present invention to provide a new and improved safety lawn mower blade which is of a durable and reliable construction.

An even further object of the present invention is to provide a new and improved safety lawn mower blade which is susceptible of a low cost of manufacture with regard to both materials and labor, and which accordingly is then susceptible of low prices of sale to the consuming public, thereby making such safety lawn mower blade economically available to the buying public.

Still yet another object of the present invention is to provide a new and improved safety lawn mower blade which provides in the apparatuses and methods of the prior art some of the advantages thereof, while simultaneously overcoming some of the disadvantages normally associated therewith.

Still another object of the present invention is to provide a safe lawn mower blade assembly with easily replaced blades.

Lastly, it is an object of the present invention to provide a new and improved a safety lawn mower blade including a central portion removably coupled to a conventional lawn mower. Also included is a plurality of replaceable blades removably coupled to a periphery of the central portion and extended radially therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
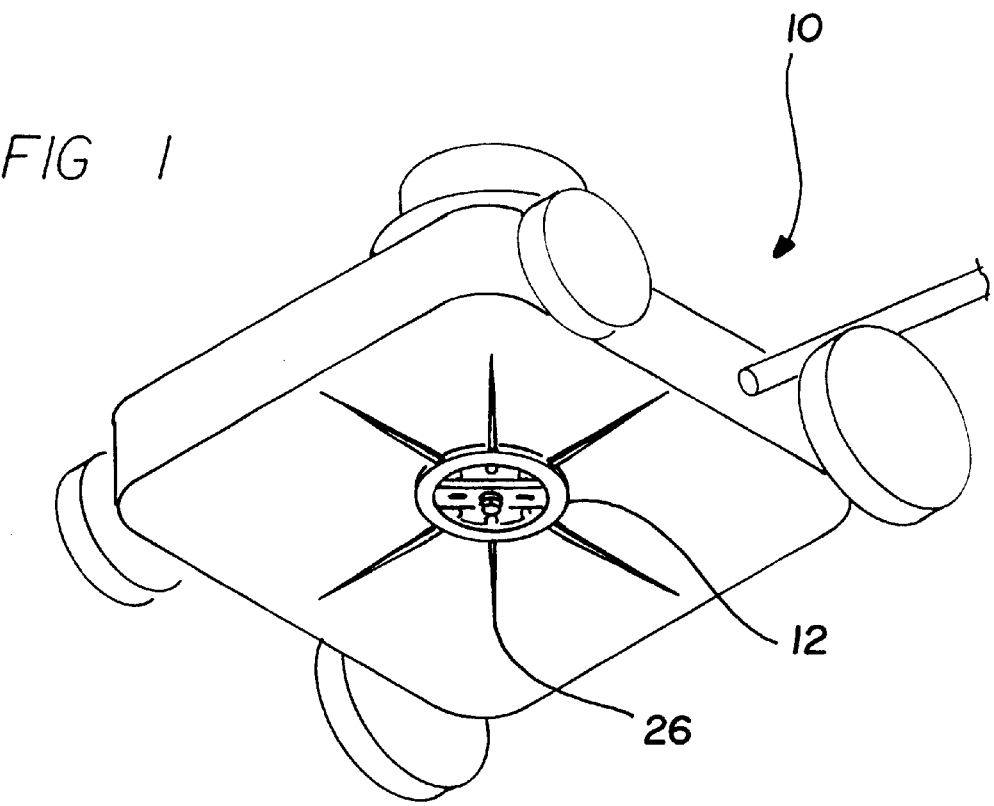
FIG. 1 is a bottom perspective illustration of the preferred embodiment of the safety lawn mower blade constructed in accordance with the principles of the present invention.
Figure 2:
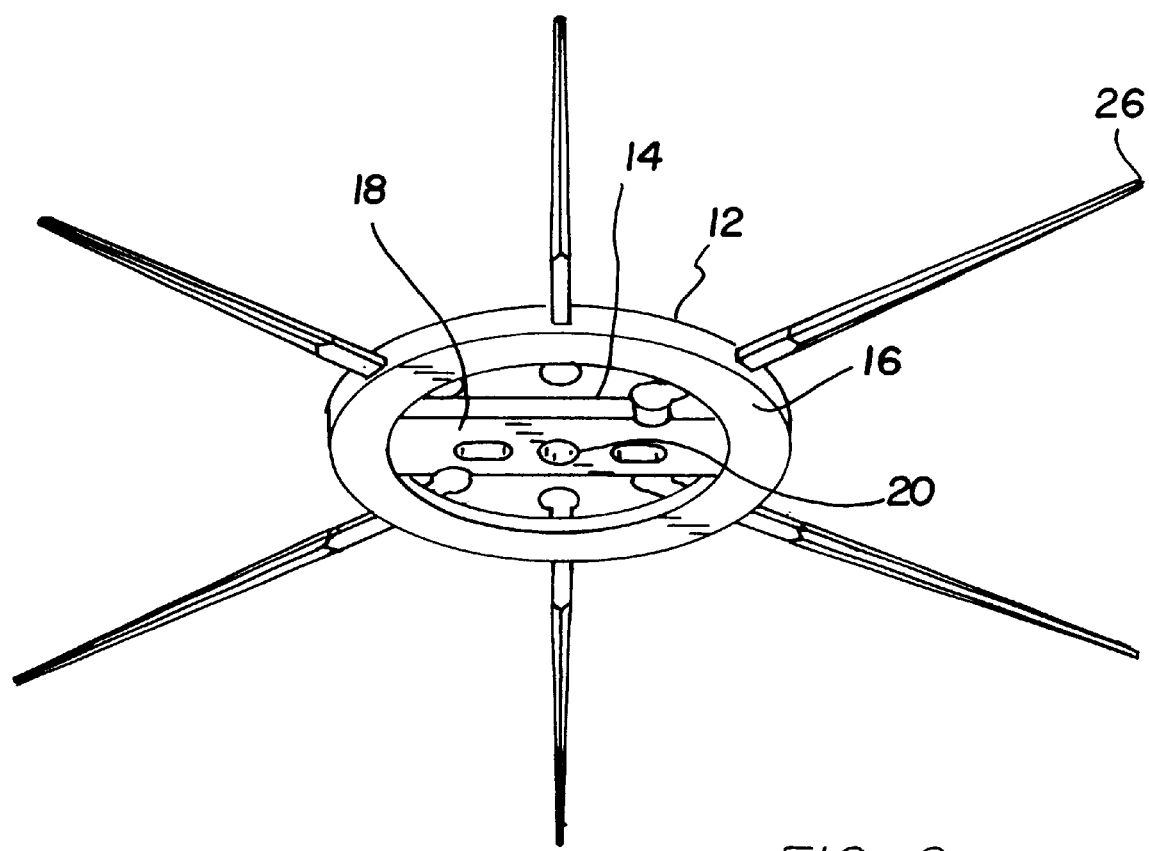
FIG. 2 is a bottom perspective view of the present invention.

With reference now to the drawings, and in particular to FIG. 1 thereof, a new and improved safety lawn mower blade embodying the principles and concepts of the present invention and generally designated by the reference numeral 10 will be described.

The present invention, the new and improved safety lawn mower blade, is comprised of a plurality of components. Such components in their broadest context include a central portion and a plurality of resilient blades. Such components are individually configured and correlated with respect to each other so as to attain the desired objective.

Figure 3:
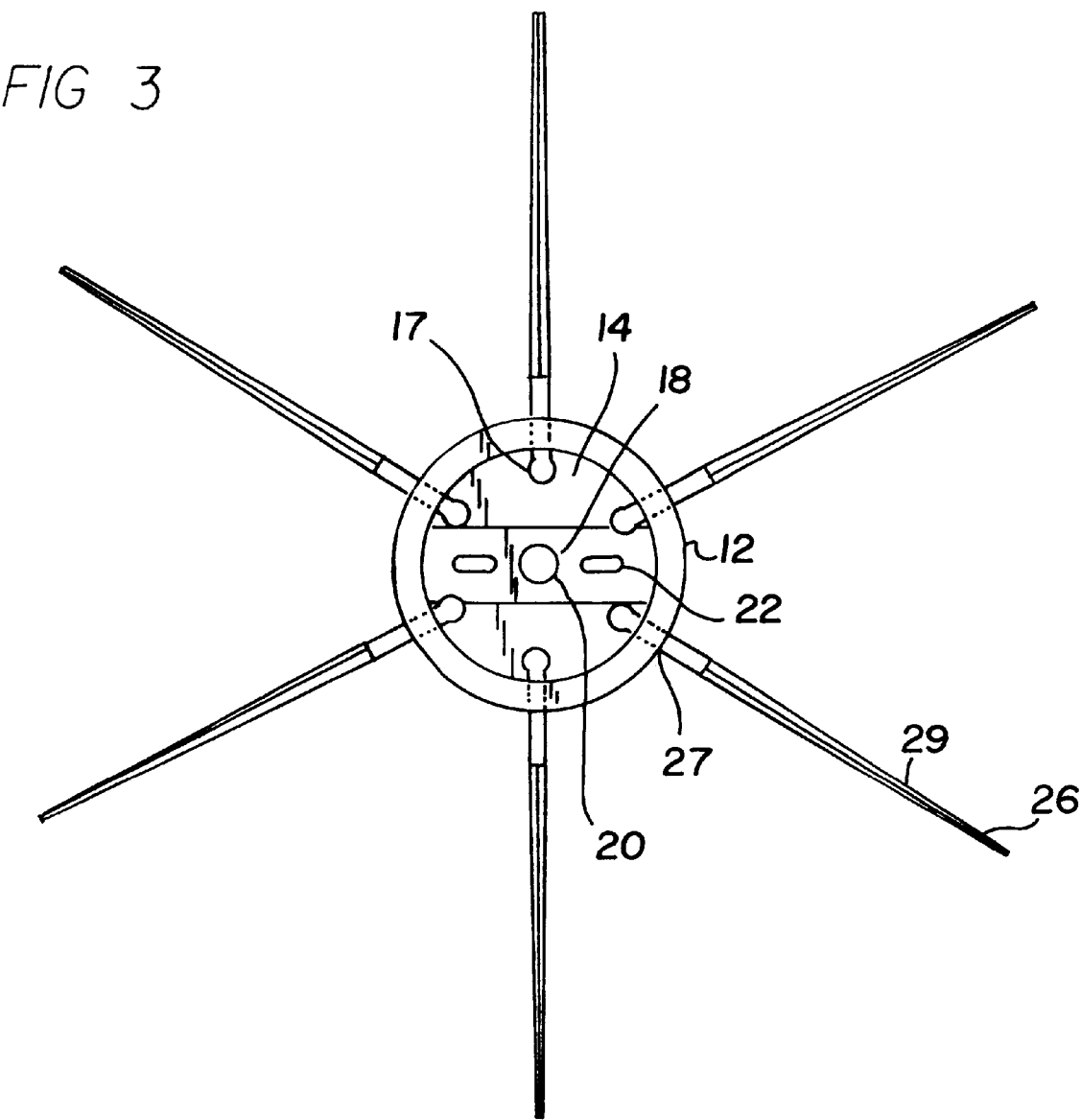
FIG. 3 is a top view of the present invention.
Figure 4:
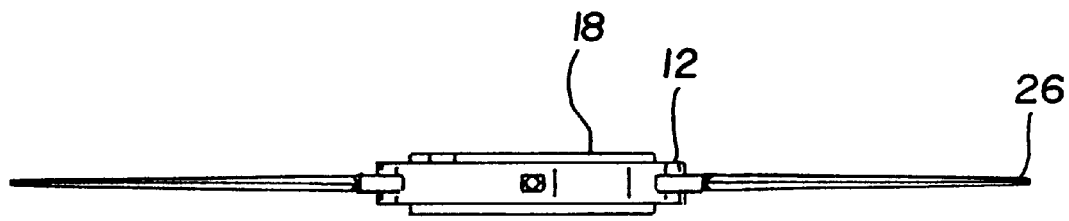
FIG. 4 is a side view of the present invention.
Figure 5:
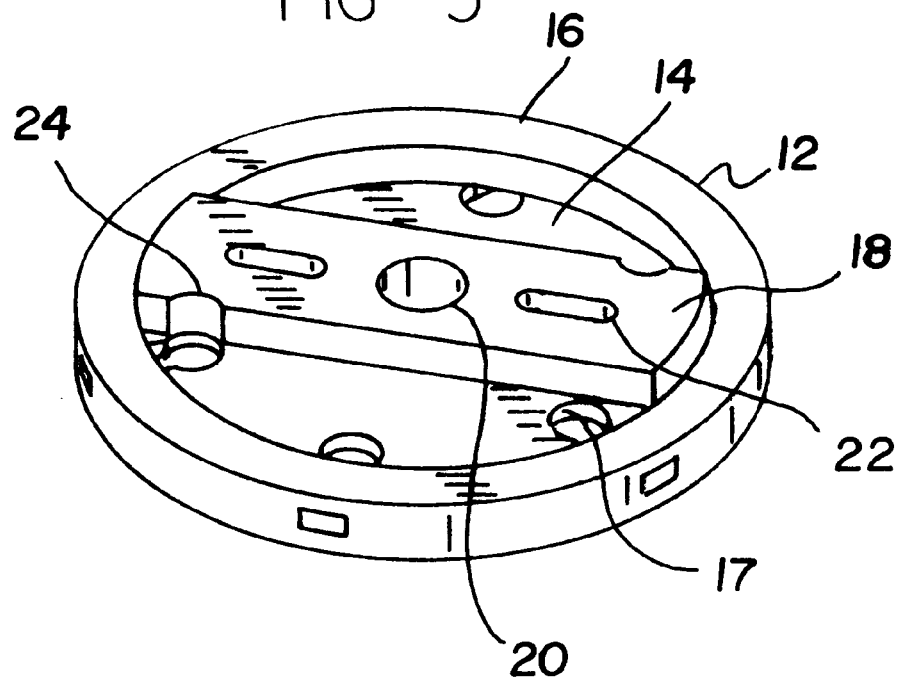
FIG. 5 is a top perspective view of the central portion of the present invention.

More specifically, it will be noted that the system 10 of the present invention includes a disk-shaped central portion 12 having a top face, a bottom face, and a periphery formed therebetween. As shown in FIG. 5, the top and bottom face each has a circular inset portion 14 with a constant depth thereby defining upper and lower peripheral lips 16. As shown in FIG. 3, the lips have a radial length which is less than ⅓ that of the recessed portions. The inset portions have a plurality of spaced circular apertures 17 formed therethrough. Such apertures are situated adjacent to the peripheral lips and further spaced from each other by about 60 degrees. With reference still to FIG. 5, the periphery of the central portion has a plurality of radially extending rectangular slits each formed therein between the periphery and an associated one of the circular apertures for reasons that will become apparent later.

A pair of planar rectangular strips 18 are each diametrically coupled within a corresponding one of the circular inset portions. Such coupling may be accomplished by way of a weld or an integral coupling. The strips are each equipped with a constant height and a length equal to a diameter of the associated circular inset portion. In the preferred embodiment, the height is greater than a depth of the circular inset portion such that each strip extends past the associated peripheral lip.

Each strip further includes a central bore 20 formed therein which extends through the entire central portion. A pair of radially aligned elongated slots 22 are situated on diametrically opposed points of each of the strips and formed through the entire central portion. The bore and slots are adapted for allowing the coupling of the central portion to a conventional lawn mower via a plurality of bolts. Since the strip may have a large width, semicircular cut outs 24 are preferably formed along its periphery in alignment with the apertures of the circular recessed portion of the central portion. Note FIG. 5.

Finally, a plurality of flexible, resilient replaceable blades 26 are provided each having an inboard extent 27 with disk-shaped member. An aperture 28 is centrally formed in the disk-shaped member. A generally rectangular member is integrally coupled to a periphery of the disk-shaped member and extended radially therefrom in co-planar relationship therewith. Each of the blades further includes an outboard extent 29 with an inboard end integrally coupled to the rectangular member in linear alignment therewith. The outboard extent of each blade further has a pair of sharp edges each situated within a similar plane.

Figure 6:
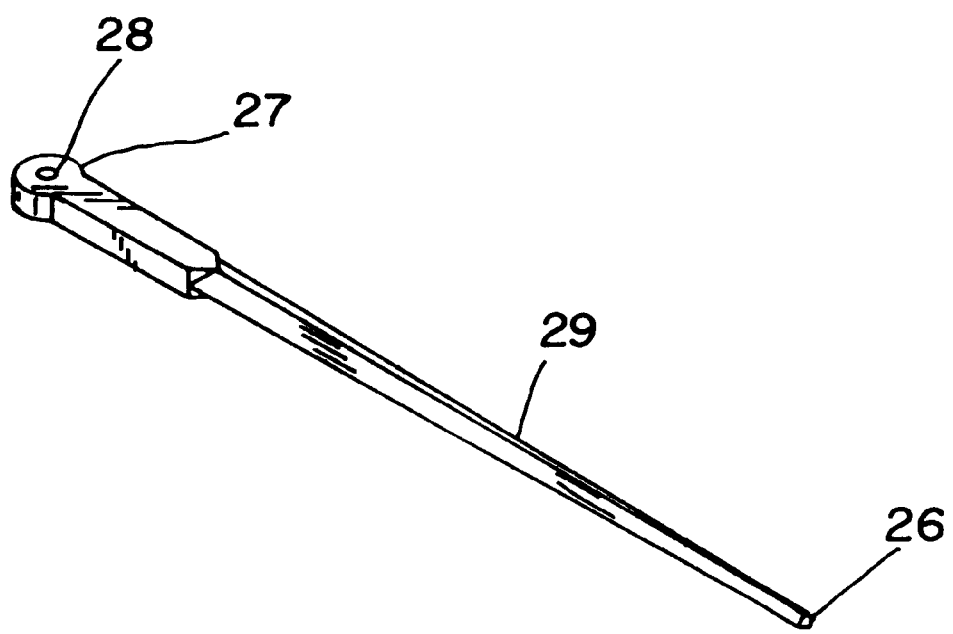
FIG. 6 is a top perspective view of one of the blades of the present invention.

As shown in the Figures, the outboard extent has a diamond shaped vertical cross-section along its entire length. Such diamond shaped vertical cross-section ideally has an area which reduces from the inboard end to an outboard of the outboard extent. As shown in FIG. 6, the outboard extent has a length that is at least 3 times the inboard extent. Further, the diameter of the disk-shaped member is less than ⅓ the length of the rectangular member. It should be noted that each of the components of the present invention are constructed from a plastic material.

During use, the blades may be removably situated through an associated one of the slits of the central portion. As such, the disk-shaped member snappily engages within the corresponding circular aperture of the central portion so the blades extend radially from the central portion for use. Due to the flexible, resilient nature of the blades, a safer lawn mower blade is afforded.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved safety lawn mower blade comprising, in combination:

a disk-shaped central portion having a top face, a bottom face, and a periphery formed therebetween, the top and bottom face each having a circular inset portion with a constant depth thereby defining upper and lower peripheral lips, the inset portions having a plurality of spaced circular apertures formed therethrough and further situated adjacent to the peripheral lips, the periphery of the central portion having a plurality of radially extending rectangular slits formed therein between the periphery and an associated one of the circular apertures;

a pair of planar rectangular strips each diametrically coupled within a corresponding one of the circular inset portions with a length equal to a diameter of the associated circular inset portion and a constant height which is greater than a depth of the circular inset portion thereby extending past the associated peripheral lip, each strip further including a central bore formed therein which extends through the entire central portion and a pair of aligned elongated slots situated on diametrically opposed points and formed through the entire central portion, the bore and slots adapted for allowing the coupling of the central portion to a conventional lawn mower; and a plurality of flexible, resilient replaceable blades each having an inboard extent with disk-shaped member with an aperture centrally formed therein and a generally rectangular member integrally coupled to a periphery of the disk-shaped member and extending radially therefrom in co-planar relationship therewith, each of the blades further including an outboard extent with an inboard end integrally coupled to the rectangular member in linear alignment therewith, the outboard extent of each blade further having a pair of sharp edges each situated within a similar plane, whereby the outboard extent has a diamond shaped vertical cross-section along its entire length with an area which reduces from the inboard end to an outboard of the outboard extent; whereby the blades may be removably situated through an associated one of the slits of the central portion such that the disk-shaped member snappily engages within the corresponding circular aperture of the central portion so the blades extend radially from the central portion for use.

2. A safety lawn mower blade comprising:

a central portion removably coupled to a conventional lawn mower, the central portion having a disk-shaped central extent having a top face, a bottom face, and a periphery formed therebetween, the top and bottom face each having a circular inset portion with a constant depth thereby defining upper and lower peripheral lips, the inset portions having a plurality of spaced circular apertures formed therethrough and further situated adjacent to the peripheral lips, the periphery of the central portion having a plurality of radially extending slits formed therein between the periphery and an associated one of the circular apertures;

a plurality of replaceable blades removably coupled to a periphery of the central portion and extending radially therefrom.

3. A safety lawn mower blade as set forth in claim 2 wherein the blades are each snappily coupled to the central portion.

4. A safety lawn mower blade as set forth in claim 2 wherein the blades are situated within the slits formed in the central portion, wherein each blade has an inboard end which is larger than the associated slit.

5. A safety lawn mower blade as set forth in claim 4 wherein the at least one recessed area has a rectangular strip mounted thereto which extends above a peripheral lip defined by the recessed area.

6. A safety lawn mower blade as set forth in claim 2 wherein the blades are formed of plastic.

7. A safety lawn mower blade as set forth in claim 2 wherein the blades are resilient and flexible.

8. A safety lawn mower blade as set forth in claim 2 wherein the central portion is formed of plastic.

9. A safety lawn mower blade as set forth in claim 2 wherein the blades each have an aperture formed therein for facilitating removal thereof from the central portion.

* * * * *